United States Patent Office 2,944,903
Patented July 12, 1960

2,944,903

PROCESS FOR STABILIZING CROPS AND THE RESULTING PRODUCT

Joseph A. Chenicek, Prairie View, Ill., assignor, by mesne assignments, to Universal Oil Products Company, Des Plaines, Ill., a corporation of Delaware No Drawing. Original application June 25, 1957, Ser. No. 667,959. Divided and this application July 21, 1958, Ser. No. 749,654

12 Claims. (Cl. 99—8)

This application is a division of application Serial No. 667,959, filed June 25, 1957, which, in turn, is a continuation-in-part of application Serial No. 392,469, filed November 16, 1953, now abandoned, which, in turn, is a continuation-in-part of application Serial No. 176,531, filed July 28, 1950, which matured into U.S. Patent No. 2,686,719, issued August 17, 1954. This application relates to the stabilization of crops and more particularly to a novel method of preserving the desirable qualities thereof.

Drying of crops in the field or in drying equipment results in a loss of valuable food accessory factors. The present invention is directed to the use of a novel inhibitor for preventing this loss. An important requirement of a satisfactory inhibitor is that it is substantially non-volatile under the conditions of use so that it will not be evaporated and lost during the drying treatment. The novel inhibitors of the present invention will be retained during the drying treatment and thereby will serve to stabilize the crops.

Another very important requirement of an inhibitor for use in the treatment of crops is that the inhibitor is non-toxic. Regardless of all its other satisfactory qualities, if an inhibitor is toxic, for obvious reasons it cannot be used for the stabilization of crops which in turn are used as food products. As will be shown in the following examples, the compounds of the present invention are non-toxic and therefore may be satisfactorily used for the stabilization of crops.

The term "crops" as used in the present invention is intended to include any substance grown from the soil to be used as a food for humans or animals, either in the form as gathered from the field or after suitable modification in form, such as by pressing, grinding, pulverizing, slurrying, making into paste, flour, etc., either used as such or after suitable cooking. Thus the present invention is applicable to the treatment of forage crops, such as alfalfa, clover, hay, fodder, etc.; grains such as corn, wheat, oats, rice, barley, rye, soy beans, etc.; vegetables such as carrots, peas, spinach, beets, potatoes, parsley cabbage, etc.; fruits including both small fruits and those grown on trees, such as berries, oranges, lemons, grapefruit, apples, bananas, melons, dates, figs, etc.; nut crops including peanuts walnuts, pecans, almonds, chestnuts, hazel nuts, etc.; hops, coffee, tea, sugar, etc. Also included are crops such as tobacco, which although not actually consumed as such are chewed and the oils therefrom are allowed to enter into the system. It is understood that the above crops are merely typical representatives and that the broad scope of the present invention is not intended to be unduly limited to the crops specifically mentioned but is to include all other crops subject to oxidative deterioration.

During the drying treatment, alfalfa loses anywhere from 45% to 85% of its carotene value. Similarly, carotene is found in sweet potatoes and in other yellow pigmented plants. Vitamin $B_1$ (thiamine hydrochloride) is found in various seeds, grains, nuts, legumes, fruits and vegetables, while vitamine $b_2$ (riboflavin) is found in wheat germ and leafy vegetables. Nicotinic acid (niacin) is found in wheat germ and in several green leafy vegetables, while vitamin $B_6$ (pyridoxine) is found in whole grain cereals, crude cane molasses, etc. Vitamin C (ascorbic acid) is found in citrus fruits, tomatoes, green peppers and various other fresh fruits and vegetables, and vitamin E is found in wheat germ oil, cottonseed oil, green leafy vegetables and various grain. Vitamin $K_1$ is found in alfalfa, spinach, and other green vegetables. Pantothenic acid is found in crude cane molasses and wheat germ. Several postulated vitamins which have not as yet been completely accepted, such as citrin, gizzard erosion factor, etc., are found in various crops, the citrin being present in citrus foods, and the gizzard erosion factor being present in alfalfa, kale, etc. It is understood that the above is merely a brief reference to the vitamin content of various crops and that these and other crops may also contain other vitamins as, for example, spinach contains vitamins A, $B_2$ later known as vitamin G (riboflavin) and C, beets contain vitamin $B_1$ potatoes contain vitamin $B_2$, parsley, cabbage, and berries contain vitamin C, etc.

In addition to vitamins or in absence of vitamins, various crops contain other desirable substances which tend to deteriorate due to oxidative deterioration. For example, various fatty acids, such as caprylic, capric, lauric, myristic, palmitic, stearic, oleic, linoleic, etc., are found in the oils of coconut, babassu, palm kernal, olive, castor, peanut, rapeseed, cottonseed, corn, soy bean, etc. Alcohols are found in cockfoot grass, wheat, lucerne leaf, etc. Various sterols are found in plant oils, ergosterol, for example being found in soya bean oil. Further, crops may become rancid and lose desirable qualities such as taste, odor, retention of physical shape (non-wilting), etc., due to oxidative deterioration.

In one embodiment the present invention relates to a process for stabilizing crops which comprises applying thereto an N,N'-di-alkyl-p-phenylene diamine wherein the alkyl groups contain from 8 to 12 carbon atoms each.

In a specific embodiment the present invention relates to a process for stabilizing carotene containing crops subject to oxidative deterioration which comprises spraying said crops with N,N'-di-nonyl-p-phenylene diamine.

In a more specific embodiment the present invention relates to a process for stabilizing alfalfa which comprises spraying alfalfa with an inhibitor comprising N,N'-di-octyl-p-phenylene diamine.

It is an essential feature of the present invention that each of the aliphatic groups substituted on the nitrogen atoms of the p-phenylene diamine contains from 8 to 12 carbon atoms and preferably from 8 to 9 carbon atoms. As hereinbefore set forth, the inhibitors of the present invention are substantially non-volatile under the conditions of use and thereby will not be evaporated during the drying treatment. Further, these inhibitors are non-toxic and therefore may be used satisfactorily for the stabilization of crops. It is understood that the alkyl groups should contain not more than 12 carbon atoms per group because longer chain alkyl groups decrease the potency of the inhibitor compound and therefore will prove unsatisfactory for the purpose intended.

Another advantage of the inhibitors of the present invention is that they are not water soluble and, when applied in the field, will not be washed away by rain or, when applied after cutting will not be removed during subsequent washing of the crops. Another advantage to inhibitors of the present invention is that they are wax soluble and, therefore, will penetrate through the waxy coating of various crops and will enter into the cells of the crops to effect stabilization of the oil therein.

The inhibitors of the present invention comprise N,N'- di-alkyl-p-phenylene diamines wherein the alkyl groups each contain from 8 to 12 carbon atoms. Preferred compounds comprise N,N'-di-octyl-p-phenylene diamine and N,N'-di-nonyl-p-phenylene diamine. Other compounds include N,N'-di-decyl-p-phenylene diamine, N,N'-di-undecyl-p-phenylene diamine, N,N'-di-dodecyl-p-phenylene diamine.

It is understood that the alkyl groups may be straight chain but preferably are branched chain. The branched chain may contain one or more branchings in the chain as, for example, in such compounds as N,N'-di-(1-ethyl-3-methylamyl)-p-phenylene diamine prepared by the reductive alkylation of p-phenylene diamine or p-nitroaniline with ethylamyl ketone, N,N'-di-4-(2,6-dimethylheptyl)-p-phenylene diamine prepared by the reductive alkylation of p-phenylene diamine or p-nitroaniline with diisobutyl ketone. Another preferred inhibitor comprises N,N'-di-(2-octyl)-p-phenylene diamine prepared by the reductive alkylation of p-phenylene diamine or p-nitroaniline with methylhexyl ketone. Still another inhibitor compound is N,N'-di-(1-ethyl-4-methylamyl)-p-phenylene diamine prepared by the reductive alkylation using ethylisoamyl ketone. A particularly preferred catalyst for effecting the reaction comprises a mixture of the oxides of chromium, copper and barium, although other suitable catalysts may be employed. In general, the reaction is effected at an elevated temperature or from about 100 to about 250° C. and a hydrogen pressure of from about 5 to about 200 atmospheres.

It is understood that the various inhibitors which may be prepared and used within the broad scope of the present invention are not necessarily equivalent in their activity but they all will serve to stabilize the crops.

The inhibitor may be applied to the crops in any suitable manner and either before or after cutting. In a preferred embodiment of the invention, the inhibitor is sprayed or dusted on the crops. When the inhibitor is liquid, it may be sprayed as such and, where the inhibitor is a solid, it may be dusted on the crops or dissolved in a suitable non-toxic organic solvent or emulsified with a wetting agent and then sprayed on the crops. A particularly suitable solvent comprises vegetable oils such as corn oil, soy bean oil, sesame oil, peanut oil, etc. or it may comprise a light hydrocarbon naphtha or kerosene which is volatile and will evaporate to leave the inhibitor absorbed in the crops. In some cases the solvent may comprise an alcohol, ether, aldehyde, ketone, etc. When utilized as an emulsion, the inhibitor may be commingled with a wetting agent, such as Aerosol, Nacconol, Santomerse, etc. or those of the gardinol type and, in fact, with any suitable non-toxic wetting agent. In still another embodiment, the liquid inhibitor may be emulsified with water and then used as a spray or made in a solution with the various solvents hereinbefore set forth and then emulsified with the wetting agent, with or without a solutizing agent, and utilized as such or in a solution or emulsion with water. For dusting, the inhibitor or a solution or emulsion thereof as hereinbefore set forth may be admixed with suitable inert material, such as clays.

The inhibitor may be sprayed or dusted by hand or from aeroplanes or by any other suitable method in order to distribute the inhibitor in finely divided particles over the crops, either as droplets or as finely divided solid particles. The inhibitor will penetrate throughout and within the leaves, seeds, etc., of the crops and will thereby serve to preserve the desirable qualities, not only of the leaves themselves, but also of the oils and the like obtained from the crops. Similarly, the inhibitor will penetrate into the larger produce such as oranges, lemons, melons, apples, pears, etc. and thereby will serve to preserve the vitamin content and other desirable properties thereof.

The inhibitor may be sprayed or dusted alone or in combination with insect or weed killing materials. In some cases, the insect or weed killing material may serve as a solvent for the inhibitor as, for example, when it is desired to use a hydrocarbon fraction, such as kerosene, for this purpose.

It is understood that the spraying or dusting of the crops may be done while the crops are in the field, either prior to or after cutting, or that the inhibitor may be applied after the crops have been gathered and stored. The amount of inhibitor to be applied to the crops may vary considerably, but in general will range from about 0.0001% to 0.5% or more by weight of active ingredient.

The following examples are introduced to illustrate further the novelty and utility of the present invention but not with the intention of unduly limiting the same.

Example I

Alfalfa containing 28 mg. of carotene per 100 grams will lose approximately 50% of its carotene content when stored at 75° F. for seven weeks. However, upon the addition of N,N'-di-(1-ethyl-3-methylamyl)-p-phenylene diamine dissolved in soy bean oil, in an amount of 0.25% by weight based on active inhibitor compound, the carotene content of the alfalfa is considerably higher when stored at 75° F. for seven weeks.

Example II

When the alfalfa is stored at 125° F. for seven weeks, it will lose approximately 77% of its carotene value. Here again, the addition of 0.25% by weight of the active inhibitor described in Example I reduces the loss of the carotene content.

Example III

N,N'-di-nonyl-p-phenylene diamine was subjected to acute oral toxicity studies using white rats and guinea pigs. This compound had an LD 50 of 2700 mg./kg. body weight of white rats and LD 50 of 2250 mg./kg. body weight of guinea pigs.

Example IV

Acute toxicity tests have been conducted with N,N'-di-octyl-p-phenylene diamine and this compound was found to have an LD 50 of 2200 mg./kg. by weight. A similar determination with N,N'-di-hexyl-p-phenylene diamine showed an LD 50 of less than 800 mg./kg. body weight. For use in food products, a minimum LD 50 of 1000 is generally required. Thus, it is seen that the N,N'-di-hexyl-p-phenylene diamine would not meet the toxicity rating, whereas the N,N'-di-octyl-p-phenylene diamine and N,N'-di-nonyl-p-phenylene diamine have LD 50 ratings which are satisfactory for use in food products.

I claim as my invention:

1. A process for stabilizing crops subject to oxidative deterioration which comprises applying thereto an inhibitor comprising a symmetrical N,N'-di-alkyl-p-phenylene diamine wherein each alkyl group contains from 8 to 12 carbon atoms.

2. A process for stabilizing carotene containing crops subject to oxidative deterioration which comprises applying thereto an inhibitor comprising N,N'-di-octyl-p-phenylene diamine.

3. A process for stabilizing carotene containing crops subject to oxidative deterioration which comprises applying thereto an inhibitor comprising N,N'-di-nonyl-p-phenylene diamine.

4. A process for stabilizing alfalfa to prevent loss in carotene content which comprises spraying the alfalfa with an inhibitor comprising N,N'-di-octyl-p-phenylene diamine.

5. A process for stabilizing alfalfa to prevent loss in carotene content which comprises spraying the alfalfa with an inhibitor comprising N,N'-di-nonyl-p-phenylene diamine.

6. Crops normally subject to oxidative deterioration containing as an inhibitor against said deterioration, a symmetrical N,N'-di-alkyl-p-phenylene diamine wherein each alkyl group contains from 8 to 12 carbon atoms.

7. Crops having a carotene content normally subject to oxidative deterioration containing, as an inhibitor against said deterioration, N,N'-di-octyl-p-phenylene diamine.

8. Crops having a carotene content normally subject to oxidative deterioration containing, as an inhibitor against said deterioration, N,N'-di-(1-ethyl-3-methylamyl)-p-phenylene diamine.

9. Crops having a carotene content normally subject to oxidative deterioration containing, as an inhibitor against said deterioration, N,N'-di-(2-octyl)-p-phenylene diamine.

10. Crops having a carotene content normally subject to oxidative deterioration containing, as an inhibitor against said deterioration, N,N'-di-nonyl-p-phenylene diamine.

11. Alfalfa containing N,N'-di-octyl-p-phenylene diamine as an inhibitor against loss in carotene content.

12. Alfalfa containing N,N'-di-nonyl-p-phenylene diamine as an inhibitor against loss in carotene content.

References Cited in the file of this patent

UNITED STATES PATENTS

| | | |
|---|---|---|
| 2,474,182 | Kephart | June 21, 1949 |
| 2,498,630 | Thompson | Feb. 28, 1950 |
| 2,513,002 | Chenicek | June 27, 1950 |